United States Patent
Martin et al.

[11] Patent Number: 5,198,112
[45] Date of Patent: Mar. 30, 1993

[54] ULTRATHIN-FILM COMPOSITE MEMBRANE

[75] Inventors: Charles R. Martin, Bryan; Mark W. Espenscheid, College Station, both of Tex.

[73] Assignee: The Dow Chemical Company, Midland, Mich.

[21] Appl. No.: 463,767

[22] Filed: Jan. 12, 1990

[51] Int. Cl.$^5$ .............................................. B01D 53/22
[52] U.S. Cl. ................................ 210/490; 210/500.34; 55/16

[58] Field of Search ........... 427/245; 210/490, 500.34; 55/16, 158; 204/72

[56] References Cited
U.S. PATENT DOCUMENTS 3,887,442  6/1975  Gilchrist ............................... 204/72
4,230,463  10/1980 Henis et al. ............................ 55/16

Primary Examiner—Frank Spear
Attorney, Agent, or Firm—Thomas A. Ladd

[57] ABSTRACT

A composite membrane suitable for separations of fluid components by electropolymerization of a discrimination layer on an electrically conductive porous support.

18 Claims, 1 Drawing Sheet

Pressure of oxygen on low pressure side of membrane vs. time

A. 350 Å thick gold coated, 0.02 μm pore diameter Anopore substrate. Pressure differential across membrane = 25 cm Hg.

B. 0.05 μm thick poly DVB/EVB coated gold coated Anopore membrane. Pressure differential across membrane = 250 cm Hg.

Pressure of oxygen on low pressure side of membrane vs. time

A. 350 Å thick gold coated, 0.02 μm pore diameter Anopore substrate. Pressure differential across membrane = 25 cm Hg.

B. 0.05 μm thick poly DVB/EVB coated gold coated Anopore membrane. Pressure differential across membrane = 250 cm Hg.

ULTRATHIN-FILM COMPOSITE MEMBRANE

BACKGROUND OF THE INVENTION

Composite membrane systems are known in the art of separations of components from fluids such as by reverse osmosis. Representative known art is U.S. Pat. No. 4,277,344 to Cadotte which teaches in situ preparation of polyamide films on porous supports useful for separation of salts from water by reverse osmosis. The polyamide film is formed at the interface of an aqueous solution of an amine, generally on a porous support and a polyacylhalide in a non-polar solution substantially incompatible with the aqueous solution of amine. The polyamide formation occurs substantially only at the interface.

Separation of gaseous components is also known by use of composite membranes. Representative gas separations composite membranes include U.S. Pat. No. 4,717,395 to Chiao which teaches membranes useful for the separation of gas components, including composite membranes having thin discriminating layer on a porous support. The discriminating layer is taught as separately formed and adhered on the support layer on a solution or dispersion of the discriminating material is coated or cast on a supporting layer and the solvent is removed to form a thin dense skin.

U.S. Pat. No. 4,230,463 to Henis et al. teaches a multicomponent membrane for separation of gas mixtures comprising a porous membrane coated with an amorphous material which wets or tends to adhere to the surface of the porous support and which demonstrates a selective permeability for a particular component of the gas mixture.

The prior art methods suffer from various handicaps. Coating of a support with a discriminating layer may result in variations of thickness of coating material. In areas where no coating is present the membrane is porous and therefore non-separating. Where the coating exceeds optimum thickness, an undue decrease of flux results. Where the discriminating layer is prepared separately, the discriminating layer frequently separates from the support, particularly under conditions where backflow occurs through the membrane, or there is turbulent flow near the discriminating layer.

A theoretical explanation of mass transport through a composite membrane for gas phase separation was developed by Lai, J-Y, et al., *Journal of Polymer Science*. Vol. 32, pp. 4625–4637 (1988). The rate of gas permeation through a composite membrane is stated as inversely proportional to the thickness of the composite layer. Thus a thin composite layer is desired. The instant invention provides a thin and substantially uniform selective polymeric layer on a porous support useful for separation of fluid mixtures.

Electrochemically initiated polymerization has been applied to deposit polymers upon electrodes for several end uses such as: corrosion protection of metals, preparation of display devices, immobilization of particulate catalysts, or preparation of ion specific sensors. In each case the application of electroinitiated polymer has been onto an impervious support. To date, however, no application has been reported wherein electroinitiated polymers have been applied to porous substrates.

Further, no report has been made of electroinitiated polymers being used as discriminating layers on porous supports for membrane separations.

The composite membranes of the instant invention are comprised of an electrochemically initiated polymerization of a discriminating layer on a porous support.

SUMMARY OF THE INVENTION

Figure 1:
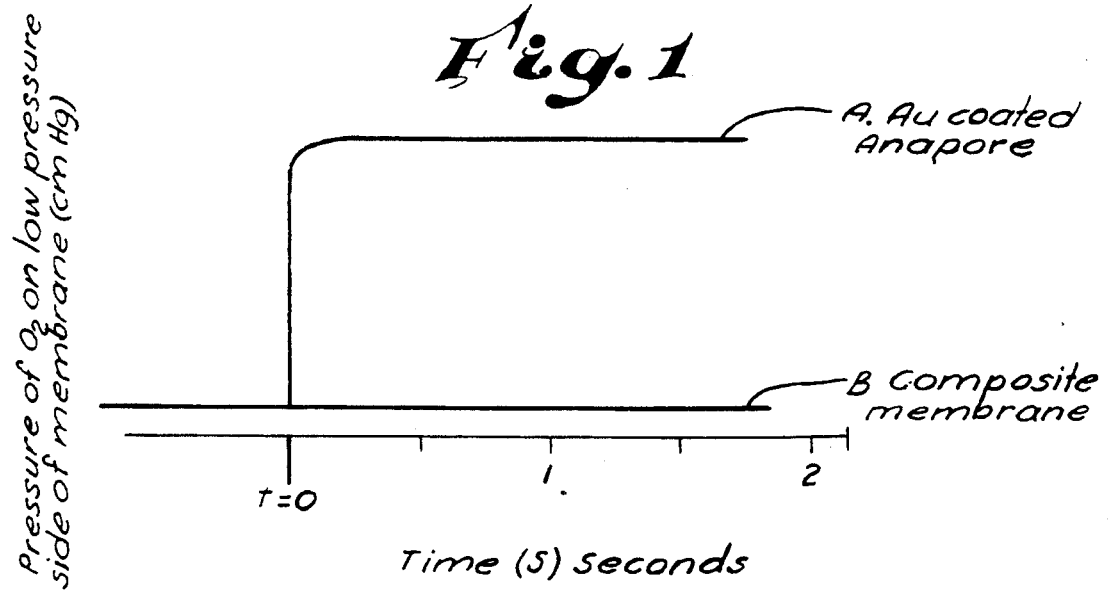
FIG. 1 is a graph of relative pressure on the low pressure side of a metal coated porous support only and a metal coated porous support having a polymeric layer prepared according to this invention plotted as a function of time.

In the preparation of composite membranes having a discriminating layer prepared from an electrochemically initiated polymerization according to this invention a conductive porous support is electrically connected to a source of electric current. The conductive porous support is then contacted with a polymerizing solution. The conductive porous support serves as an electrode of an electrolytic cell. The porous support must be of an electrically conductive material, or rendered electrically conductive by for instance plating the porous support with a conductive layer of a metal or other electrical conductor. The conductive layer must be sufficiently thin so as to not block the pores on the surface of the porous support.

The electrolytic cell is charged with a polymerizing solution of an electropolymerizable monomer, or a mixture of electropolymerizable monomers, effective for the formation of composite membranes.

DESCRIPTION OF THE INVENTION

The polymerization mechanisms reported for electrolytically initiated polymerization are ionic polymerization, both cationic and anionic, and free radical polymerization. *Encyclopedia of Polymer Science and Engineering*, Electrochemical Initiation, John Wiley & Sons, New York, Vol. 5, p. 591, (1986). These polymerization initiation species are formed as current flows between electrodes.

The solvent of the polymerization solution and components of the solution must be carefully selected and prepared as with any carbanion, anionic or free radical initiated polymerization. Common precautionary measures known in the art of ionic polymerization reactions include purified reagents to remove ion, or free radical (as the case may be) scavenging species, including protic species such as water. The solvent must also be electrochemically inert at the voltages applied. Solvents generally found suitable include N,N-dimethylformamide, dimethylsulfoxide, acetonitrile, and mixtures of such solvents.

Monomers usable in the preparation of discrimination layers of composite membranes by electrochemically initiated polymerization include those monomers containing vinyl groups and polycyclicaromatic species. The selection of monomer or mixture of monomers, and the degree of crosslinking provide opportunities to customize the transport properties of the membrane discriminating layer.

Effective concentrations of monomer in the polymerization solution may range from 0.1M to pure monomer. Generally the monomer will not be sufficiently electrically conductive to effectively initiate the electropolymerization. In the general circumstance, it is necessary to add electrolyte to the polymerization solution. However, electrolytes are seldom soluble in the monomer in effective amounts. Therefore it is frequently necessary to employ a solvent to dissolve an effective amount of electrolyte in the polymerization solution. The presence of solvent dilutes the otherwise neat monomer. Thus, the upper monomer concentration is limited by the solubility of the electrolyte in the neat monomer, and the solvent chosen for the electrolyte. Advantageously the monomer concentration ranges from 1M to 10M. Preferably, the electrolyte is dissolved in neat monomer.

The concentration of monomer in the polymerization solution influences properties of the resulting polymerized film. The rate of ionic polymerization is known to be directly proportional to the concentration of monomer in the polymerization solution. Billmeyer, F. W., Jr., *Textbook of Polymer Science*, John Wiley & Sons, New York, 1984, pp. 82-91. Electrochemically initiated polymerization may form ionic species either cationic or anionic. Once the ionic initiation species is formed electrochemically, the polymerization follows an ionic polymerization. Consequently, the monomer concentration in the polymerization solution also influences the polymerization rate for electrically initiated polymerization.

Similarly for free radical polymerization, the monomer concentration of the polymerization solution also influences the polymerization rate. Where electrochemical initiation forms free radicals, the rate of polymerization is also influenced by the monomer concentration in the polymerization solution.

A second observed effect of monomer concentrations relates to the polymer films. Films prepared from polymerization solutions having low concentrations of monomer, or monomer mixtures, have an opaque and powdery appearance, are porous, and therefore unsuited for use as a discriminating layer for composite membranes. In contrast, membranes from more concentrated monomer solutions are more transparent and less porous. For monomer mixtures of divinylbenzene and ethylvinylbenzene of a ratio of about 1.1 to 1, suitable membrane formation occurs at total monomer concentrations of above 0.5M. A Porous polymer layer is formed from total monomer concentration of the divinylbenzene and ethylvinylbenzene of less than 0.45M in the ratio of 1.1 to 1.

Higher concentrations of monomer also result in thinner polymer layers on conductive surfaces. As observed above, the thickness of the nonporous discriminating layer directly reduces the permeability of the membrane. Hence, for composite membrane purposes, monomer concentrations should be sufficient to produce thin, nonporous polymer layers in electrochemically initiated systems.

Desirable electrolytes are readily soluble in the solution of monomer(s) and solvent. The ions of a suitable electrolyte have a high degree of mobility, and the ions have a numerically high discharge potential. Frequently used electrolytes include perchlorates, including tetraalkylammonium, sodium and lithium, tetrabutylammonium tetrafluoroborate, hexafluorophosphates, and nitrates such as tetrabutylammonium nitrate.

With styrenic monomers, the concentration of electrolytes influences the thickness of the polymer film formed such that as the concentration of electrolyte decreases the thickness of films formed increases. Operable concentrations of electrolyte are between about 0.1M and the saturation limit of the electrolyte in the solvent monomer system. The saturation limit is typically less than 5M. Therefore useful electrolyte concentration limits are usually between 0.1M and 5M. In general it is preferable to have as high a concentration of electrolyte as possible because higher electrolyte concentrations yield thinner polymer films.

Applied voltage for formation of an electrochemically initiated membrane discriminating layer is consistent with voltage of known electrochemical reactions which ranges from zero to an absolute value of 5 volts with respect to the normal hydrogen reference electrode. Reference electrodes useful in the electropolymerization could be the normal hydrogen electrode, the saturated calomel, the silver/silver chloride or other suitable standard electrode. However these electrodes use aqueous electrolytes which leak water into the polymerization solution. For this reason, a silver wire quasi-reference electrode is preferable.

Whether the electrical potential is positive or negative with respect to the reference electrode (that is whether the porous electrically conductive membrane support, the working electrode, is the anode or the cathode of the electrolytic cell) depends on whether the species is advantageously polymerized by an anionic or cationic polymerization mechanism. Styrene, for instance, is known to polymerize by anionic, cationic or free radical mechanisms from electrochemically initiated polymerization. For free radical polymerization initiated by electrochemical means, the working electrode can be either positive or negative with respect to the reference electrode.

The voltage may be applied to the electrodes of an electrolytic cell at a predetermined level, or varied over a cycle from an initial potential, including zero over a range of voltage to a final value including zero. The duration of the voltage applied to the electrodes necessary to deposit an effective discriminating layer on a porous membrane support is relatively short. The time can vary from a few microseconds to several minutes, even 5 minutes in dilute monomer solutions. As will be seen below from the examples illustrative of this invention, membrane discriminating layers are effectively formed after a brief applied voltage.

Electrochemical initiation of polymerization is effective over a wide range of temperatures. The electrochemically initiated polymer layer is conveniently formed at room temperature and atmospheric pressure. The temperature limits of the polymerization are those for which the monomer solvent of the electrolytic cell is a liquid. Pressure and temperature deviation from ambient conditions for the electrochemically initiated polymerization while operable are not advantageous.

Discriminating layers for composite membranes formed according to this invention are very thin. Discriminating layers may range from about 1 $\mu$m to about 0.01 $\mu$m. The discriminating layers are capable of bridging porous structure of the conductive support. Conveniently the pore diameter of the conductive support is less than 0.25 $\mu$m. Advantageous pore diameters range from about 0.1 $\mu$m to as small as 10 Å. Pores as large as 0.50 $\mu$m can be bridged by electropolymerized discriminating membrane layers. However, the thickness of the polymerized discriminating layer required to bridge large pore diameters could adversely effect the overall flux of the resulting composite membrane. Therefore advantageously the pore diameter of the supporting membrane is from about 0.1 $\mu$m to about 10 Å.

The invention is illustrated by, but not limited to, the following examples:

EXAMPLE 1

A porous membrane of porous alumina having a pore diameter of 0.2 μm is used as a support. The membrane is used as provided by Anotec Separations Limited, Banbury, Oxfordshire OX16 7JU, United Kingdom. The membrane is prepared according to the method taught by Furneaus, R. C. et al. in *Nature*, Vol 337, p. 147–149, Jan. 12, 1989, of anodizing aluminum in electrolytes to form a porous oxide of remarkably uniform cells containing a cylindrical bore. In the formation to the alumina layer by anodizing aluminum the voltage may be reduced in a series of small steps to cause uniform barrier-layer thinning. Reducing the voltage caused the pores to subdivide into many smaller pores and reduction of the barrier layer sufficient to separate the membrane from the aluminum metal.

The alumina membrane is rendered conductive by coating the porous alumina substrate with a layer of gold. A deposit of 500 Å of gold is applied to the alumina support using a Techniques Hummer argon plasma depositor. The alumina supports are placed on an aluminum stage a distance of approximately 2.5 cm below a 2 cm diameter gold disc. A potential of from 5 to 10 V is applied between the gold disc and the aluminum target in an atmosphere of 90 to 125 mmHg argon creating an argon plasma. The argon plasma sputters gold atoms from the surface of the gold target. A uniform layer of gold atoms collects on the alumina support membrane at the rate of approximately 100 Å. per minute.

A copper wire is attached to a gold coated porous alumina support by a silver epoxy and subsequently the silver epoxy connection is coated with an insulating epoxy to expose only the gold coated surface.

A working electrode of the gold coated alumina is placed in a glass electrolytic cell. A silver wire placed within 0.5 cm of the working electrode serves as the reference electrode. A counter electrode of gold foil is located in the cell containing a solution of 0.3M tetra-n-butyl ammonium perchlorate as the electrolyte in N,N-dimethylformamide.

Monomers of divinylbenzene and ethylvinylbenzene are present in the polymerization solution. The polymerization solution is prepared by adding the solid electrolyte to neet monomer. The monomer/electrolyte slurry is then added to the N,N-dimethylformamide and dissolved at ambient temperature with stirring to form a polymerization solution having a total concentration of 3.4M in a ratio of about 55 percent divinylbenzene and 45 percent ethylvinylbenzene. Oxygen is removed from the polymerization solution by sparging with prepurified nitrogen gas for about 15 minutes.

After correction of the necessary voltage for the internal resistance of the polymerization solution and electrolyte, by conventional iR compensation techniques, polymerization is initiated by applying an electrical potential to the working electrode over the range starting from 0.00V then proceeding continuously to −2.75V then returning to 0.00V at a scan rate of 200 mV/second using a potentiostat. The measured electric potentials are with respect to the silver quasi-reference electrode. The supported membrane-working electrode is removed from the electrolyte-polymerization solution after one complete voltage cycle.

The porous alumina support membrane having a polymer layer is rinsed in acetone to remove monomer, low molecular weight oligomers and excess electrolyte. The composite membrane is dried at 80° C. in air for 12 hours.

A cross-section of the sample is examined under an electron microscope after coating with a 100 Å gold film. Examination of the electronmicrograph reveals a polymeric layer approximately 2000 Å thick.

The composite membrane is tested in a single gas permeation apparatus similar to that used by Koros and Sanders reported in *Journal of Membrane Science*, 1986, 32, 4625. The composite membrane is positioned in a cell such that the polymer coating is exposed to a high pressure gas source. Pressure measurement and volumetric measurements are provided. The composite membranes were masked on the polymer side with aluminum foil tape having a hole 0.79 cm². The support side of the composite membrane is supported by porous filter paper to protect the porous support from damage from a sintered metal support of the test apparatus.

The gas permeation properties of the composite membrane are presented in Table I.

TABLE I

| Gas | Pressure (CmHg) | Permeance × $10^5$ $\frac{cm^3 \text{ (STP)}}{cm^2 cmHg\ Sec}$ |
|---|---|---|
| Carbon Tetrafluoride | 178.25 | 0.45 |
| Nitrogen | 185.31 | 0.787 |
| | 209.61 | 0.730 |
| | 256.14 | 0.788 |
| | 307.84 | 0.820 |
| | 360.57 | 0.875 |
| Oxygen | 100.00 | 1.44 |
| | 258.72 | 1.50 |
| | 307.84 | 1.51 |
| | 360.57 | 1.68 |
| | 411.24 | 2.05 |
| | 468.11 | 3.10 |
| Helium | 208.57 | 7.44 |
| | 258.72 | 7.45 |
| | 310.42 | 7.44 |
| | 360.57 | 7.37 |
| | 411.76 | 7.49 |
| | 462.94 | 7.69 |
| Argon | 205.46 | 0.829 |
| | 308.87 | 0.915 |
| | 359.54 | 0.922 |
| | 415.37 | 0.941 |
| | 462.94 | 0.985 |

The separation factor of the membrane for two gases is recognized as the ratio of the membrane permeance for each gas.

The separation factor for oxygen/nitrogen of this composite membrane of Example 1 is generally less than 2.0. The separation factor of polystyrene, a closely related polymer to the polymer formed in this example for oxygen/nitrogen is generally recognized to be greater than 2.0. The discrepancy suggests there may be porosity in the membrane formed.

EXAMPLE 2 through 6

Composite membrane of an electroinitiated polymerization are prepared according to Example 1 except that the concentration of the monomer is the polymerization solution is varied according to the values of Table II. Corresponding membrane thicknesses are identified for each concentration of monomer. The electrolyte concentration is 0.30M. Polymerized membrane thickness is measured from electronmicrographs.

TABLE II

| Example | DVB[1] | EVB[2] | Thickness μm |
|---|---|---|---|
| 2 | 0.12 | 0.098 | 0.5 |
| 3 | 0.18 | 0.15 | 0.35 |
| 4 | 1.85 | 1.5 | 0.12 |
| 5 | 2.3 | 1.9 | 0.08 |
| 6 | 2.5 | 2.0 | 0.06 |

[1] DVB Molar concentration of Divinylbenzene
[2] EVB Molar concentration of Ethylvinylbenzene

EXAMPLE 7

A sample of membrane prepared according to Example 1 is coated uniformly with a layer of polysiloxane available under the name of Sylgard TM 184, 5 percent in n-pentane, sold by Dow Corning Corporation, Midland, Mich., 48640 U.S.A. on the polymeric surface according to the method of Henes et al. in U.S. Pat. No. 4,230,463. The polysiloxane is a two part mixture of a polyorganosilane composition which is polymerized by a platinum catalyst in a hydrosilylation reaction. The siloxane treated composite is cured at 60° C. for 24 hours. The gas permeation properties of the treated composite membrane are presented in Table III.

TABLE III

| $PO_2(\times 10^5)$ | $PN_2 (\times 10^5)$ | Pressure (cmHg) | $O_2/N_2$ |
|---|---|---|---|
| — | 0.054 | 230.3 | — |
| — | 0.046 | 286.1 | — |
| — | 0.056 | 338.9 | — |
| 0.347 | 0.056 | 388.0 | 6.2 |

The treatment with the polysiloxane reduces the permeance of the membrane to nitrogen by more than an order of magnitude and reduces the permeance to oxygen by ca. 4.3. Hence, the untreated membrane may be concluded to have been porous. Furthermore, as shown in Table III, the separation factor for the treated membrane increased to 6.2. This is significantly larger than the separation factor for the untreated membrane. This increase in separation factor also indicates that the untreated membrane was porous and that treatment with the polysiloxane plugs the pores.

Reducing the porosity therefore increases the selectivity of the membrane for gas separation uses.

COMPARATIVE EXAMPLE 1

A porous alumina membrane having a pore size of 0.02 μm coated with a layer of gold 350 Å thick is tested for resistance to gas transport using oxygen gas at a pressure of 25 cmHg. FIG. 1 illustrates the pressure of oxygen on the low pressure side of the membrane as a function of time after application of Oxygen pressure.

For comparison purposes, the graph also shows the relative downstream pressure of a composite membrane having a discriminating layer of DVB/EVB polymer having a thickness of 0.05 μm prepared according to this invention on a gold coated porous support at a ten fold higher pressure driving force of 250 cmHg. The graph illustrates that the permeance of the composite membrane is controlled by the properties of the polymer coating, not the metal coated porous support.

EXAMPLE 8

A composite membrane is prepared according to the method of Example 1 except the porous support membrane is an alumina support having a pore diameter of 0.2 μm topped by a thin layer of pores 0.02 pm on the surface of the support membrane. Smaller support pore size is selected to determine if polyDVB/EVB films prepared by electrochemically initiated polymerization are inherently porous or if the supporting membrane having a smaller pore size would result in formation of a non-porous electrochemically initiated polymer layer.

The membrane formed is tested according to the method of Example 1. The gas permeation properties of the composite membrane are presented in Table IV. The reduced permeability values shown suggest a reduced porosity of the membrane formed. If the polymer layer is of the same material, and the porous layer does not limit gas flow, the permeability of the composite membranes of Example 1 and this Example 8 should be the same. However, the ratio of permeabilities for oxygen/nitrogen increases from about 2.0 to approximately 4.5. The increased selectivity, and reduced permeability of the membrane of this Example is believed to be due to a reduced porosity in the membrane of this Example. Additional evidence of reduced porosity in this Example is the fact that carbon tetrafluoride has no immeasurable permeability through the membrane of this Example in contrast to the membrane of Example 1.

TABLE IV

| Gas | Pressure (cmHg) | Permeance $\times 10^5 \frac{cm^3 (STP)}{cm^2 cmHg \ Sec}$ |
|---|---|---|
| $CF_4$ | 180 | 0 |
| Nitrogen | 232.9 | 0.0865 |
|  | 284.8 | 0.09 |
|  | 395.7 | 0.107 |
|  | 450.0 | 0.11 |
| Helium | 230.2 | 4.87 |
|  | 282.0 | 5.1 |
|  | 333.7 | 5.05 |
|  | 393.1 | 5.30 |
|  | 437.1 | 5.47 |
| Oxygen | 232.9 | 0.41 |
|  | 282.0 | 0.48 |
|  | 392.6 | 0.45 |
|  | 400.4 | 0.42 |
|  | 437.0 | 0.49 |

What is claimed is:

1. A composite membrane comprising a porous support and an electrochemically-initiated polymerized discriminating layer.

2. The composite membrane of claim 1 wherein the discriminating layer is a polymer of monomers selected from the group consisting of monomers containing vinyl groups, and polycyclic aromatic groups.

3. The composite membrane of claim 1 wherein the discriminating layer is a polymer comprising divinylbenzene.

4. The composite membrane of claim 1 wherein the electrochemically-initiated polymerized discriminating layer is from about 1.0 μm to about 0.01 μm thick.

5. The composite membrane of claim 1 wherein the porous support is rendered conductive by a deposited conductive layer.

6. The composite membrane of claim 1 wherein the electrochemically-initiated polymerized discriminating layer is supported by a porous support of a mean pore diameter from about 0.01 μm to about 0.50 μm.

7. The composite membrane of claim 1 characterized by an oxygen/nitrogen separation factor greater than 2.

8. A method of making a composite membrane comprising immersing a conductive porous membrane support as a first electrode in an electrically conductive solution, comprising one or more monomers the polymerization of which may be electrochemically initiated by applying a voltage between the conductive porous membrane support as an electrode and a second electrode in the solution.

9. The method of claim 8 wherein the electrically conductive solution comprises an electrolyte selected from the group consisting of tetraalkylammoniumperchlorate sodium perchlorate, lithium perchlorate tetraalkylammonium tetrafluoroborate, tetraalkylammonium hexafluorophosphate, tetralkylammonium hexafluoronitrates.

10. The method of claim 8 wherein the conductive porous membrane comprises a conductive metal layer.

11. The method of claim 8 wherein the electric potential is from zero to an absolute value of 5 volts compared to the normal hydrogen electrode.

12. The method of claim 8 wherein the monomers for electrochemically-initiated polymerization are selected from the group consisting of monomers containing vinyl groups, and polyaromatics, and mixtures thereof.

13. The method of claim 8 wherein the electrochemically-initiated polymerizable monomers comprise divinylbenzene, ethylvinylbenzene, styrene, or mixtures thereof.

14. The method of claim 8 wherein the electrically conductive solution comprises an electrolyte present in a concentration from 0.1M to the saturation limit of the electrically conductive solution.

15. The method of claim 8 wherein the monomer(s) the polymerization of which may be electrochemically initiated are present in an electrically conductive solution in a concentration from about 0.5M to the concentration of neat monomer(s).

16. The method of claim 9 wherein one or more alkyl group are selected from the group consisting of methyl, ethyl, propyl, butyl, pentyl, hexyl, septyl and octyl.

17. A method of separating components of a mixture of gases comprising passing one, or more, but less than all components through a composite membrane comprising a discriminating layer prepared from electrochemically-initiated polymerization of monomer(s).

18. The method of claim 17 wherein the mixture of gases is air, and the membrane has an oxygen/nitrogen separation factor greater than 2.0.

* * * * *